United States Patent Office 3,546,199
Patented Dec. 8, 1970

3,546,199
PROCESS FOR PRODUCING POLYOXYALKYLENE ETHER-POLYOLS FROM LIGNIN
Daniel T. Christian, San Leandro, Melvin Look, El Cerrito, and Albert Nobell and Thomas S. Armstrong, Coloma, Calif., assignors to Kaiser Aluminum & Chemical Corporation, Oakland, Calif., a corporation of Delaware
No Drawing. Filed Feb. 6, 1967, Ser. No. 614,043
Int. Cl. C07c *69/76;* C07g *1/00;* C08g *22/08*
U.S. Cl. 260—124       8 Claims

ABSTRACT OF THE DISCLOSURE

A process for producing polyoxyalkylene ether-polyols from lignin or tannin by reacting lignin or tannin with an oxyalkylating agent thereby producing a polyoxyalkylene ether-polyol adapted to be reacted with isocyanates having at least 2 NCO groups per molecule to produce a urethane product.

FIELD OF THE INVENTION

This invention is directed to the production of polyoxyalkylene ether-polyols. More particularly, it relates to the preparation of polyoxyalkylene ether-polyols from wood and plant substances such as lignin and tannin and to the products so obtained.

BACKGROUND

Polyoxyalkylene ether-polyols have widespread commercial use, especially in the preparation of urethane products. Urethanes, including polyurethanes are used for adhesives, castings, insulating products and foams. The polyoxyalkylene ether-polyols produced by the present invention are advantageously employed in making urethanes for all of these ultimate applications.

Lignin, which is a by-product of the pulp and paper industry is available in large quantities and because of its complex nature and undefined chemical structure has not been generally considered as a valuable chemical intermediate and in fact it has created many disposal problems.

Tannin, although its use as a tanning agent, e.g. in the leather industry, is widespread, was equally considered in view of its complex and undefined chemical structure to have only limited application for the preparation of valuable chemical intermediates.

The present invention provides useful products derived by chemical transformation of these wood and plant products; and also an advantageous process for making such products.

Lignin which is employed in the present invention is a complex naturally-occurring solid polymer consisting essentially of a group of closely related compounds. The major commercial source of lignin is from the wood pulping industry. The lignin varies according to its source, such as tree or plant source, and to the treatment it underwent to be separated from cellulose. The lignin structure consists of repeating units of phenylpropyl groups with each repeating unit having an approximate molecular weight of 800. It is also believed that each repeating unit possesses four hydroxyl groups when the lignin is in the wood.

The structures of commercial lignin materials vary according to their isolation method and their source. Useful lignin starting materials for the process of the present invention are those which have an average molecular weight from about 500 to about 12,000.

Lignin from a sulfite pulping process and which has been desulfonated with alkali generally has an average molecular weight of between 5,000–10,000. Lignin from a kraft pulping process has an average molecular weight of 1500–2000. A kraft lignin which has been demethylated by an alkaline-sulfur treatment to produce dimethylsulfide has an average molecular weight of 800–1000. As the molecular weight of the lignin materials decreases, the number of hydroxyl groups per given weight of lignin increases. The demethylated lignin is believed to have additional hydroxyl groups formed by the demethylation at methoxy sites.

The term "lignin" as used herein is meant to include all lignin materials obtained from either the sulfite pulping process or the kraft pulping process as well as all modified lignins which after modification still possess hydroxyl groups. Lignins having a hydroxyl number from 25 to 1500 are adaptable for the process of the present invention.

Tannin is a naturally occurring substance widely found, probably as a glucoside, in the bark and other parts of trees. There are two major groups of tannins known as the condensed tannins and the hydrolyzable tannins. Although hydrolyzable tannins are also useful for the purpose of this invention, the preferred tannins are the condensed tannins. The occurrence of condensed tannins is particularly marked among certain plant families which belong to the Archichlamydeae division of the Dicotyledonae. Such plant families include the Fagaceae (chestnut, oak and tan oak), Leguminosae (black wattle), Meliaceae (mangroves), Anacardiaceae (quebracho, tizerah and urunday), Rhizophoraceae (mangroves) and Myrtaceae (eucalypts). Condensed tannins obtained from these plant families are preferably used for the purpose of the present invention.

Although the molecular structure of tannins is not known it has been established that tannins are polymeric polyphenols.

The term "tannin" as used herein is meant to include both condensed and hydrolyzable tannins. Tannins having a hydroxyl number from 25 to 1500 are adaptable for the process of the present invention.

Both lignin and tannin possess phenolic hydroxyl groups utilizable by the process of the present invention in the preparation of polyoxyalkylene ether-polyols.

The present invention also provides a method for producing urethane products by reacting lignin or tannin with an oxyalkylating agent thereby producing a polyoxyalkylene ether-polyol adapted to be reacted with isocyanates having at least two NCO groups per molecule to produce a urethane product. The urethane so produced can be formed into a foam with the aid of a suitable foaming agent.

DETAILED DESCRIPTION

To accomplish the oxyalkylation of lignin or tannin, conventional oxyalkylating agents well known in this art can be employed. However, in the process of the present invention, the use of alkylene oxides, alkylene carbonates, alkylene sulfites or mixtures of these with each other is preferred. The most common oxyalkylating agents available for forming the polyoxyalkylene ether from lignin or tannin are selected from alkylene oxides or alkylene sulfites or alkylene carbonates having two to seven carbon atoms. In case of the alkylene carbonates the carbon atom of the carbonic acid group is not included in this number. The preferred oxyalkylating agents are those which have a 1.2-oxide, 1.2-carbonate or 1.2-sulfite linkage.

Although the reaction between the lignin or tannin and the oxyalkylating agent can be accomplished without catalysts, the use of catalysts such as alkali metal hydroxides or carbonates as well as alkali earth metal hydroxides and carbonates or other well known basic catalysts is advantageous in carrying out the oxyalkylation reaction.

The oxyalkylation of lignin or tannin can be accomplished at atmospheric conditions by adding the particular oxyalkylating agent at room temperature or at elevated temperature. If desired, agitation of the mixture can be employed and can provide better reaction conditions. The temperature for the oxyalkylating step is suitably varied according to the type of lignin or tannin used and also the type of oxyalkylating agent employed. The temperature may vary from about 20° C. to about 250° C. The reaction can be accomplished at atmospheric pressure or at pressures greater than atmospheric, e.g. up to 250 p.s.i.g. or higher.

The oxyalkylation can also be accomplished in the presence of a solvent which can be characterized as being reactive or unreactive to oxyalkylation. The first class of solvents includes any compound containing active hydrogen atoms, especially alcohols and primary and secondary amines, which will undergo oxyalkylation concurrently with lignin or tannin. The term "active hydrogen atoms" refers to hydrogens which display activity according to the Zerewitinoff test as described by Kohler in J. Am. Chem. Soc., 49, 3181 (1927). The alcoholic compounds include any compound containing at least two hydroxyl groups per molecule. Examples of such alcoholic compounds are glycols, glycerine, alpha-methyl glucoside and sorbitol. The amino compounds include any primary or secondary amine. Examples of primary amines suitable as solvents are aliphatic amines such as methyl, ethyl, propylamine and any aromatic amines such as aniline, toluidine, tolylene diamine, methylene dianiline or polymethylene polyphenylene polyamine. Examples of secondary amines are diethanol amine, diethylene triamine, N,N'-dimethyl tolylene diamine. Alkylene oxide adducts of the above alcoholic and amino compounds can also be used as reactive solvents. The second class or those solvents which are unreactive to oxyalkylation include any solvent which will dissolve lignin or tannin or which will serve as a suspension medium for lignin or tannin but which do not undergo oxyalkylation. This class of solvents includes benzene, toluene, chlorobenzene and particularly oxygenated compounds having no active hydrogens. Preferred nonreactive solvents which will increase the solubility of the lignin or tannin are polar solvents such as dimethyl formamide, tetrahydrofuran, dimethyl sulfoxide.

When the polyoxyalkylene ether-polyol is utilized in the preparation of polyurethane foams, sufficient oxyalkylating agent should be employed in order to obtain a polyoxyalkylene ether-polyol which has a hydroxyl number in the range of about 50 to 1000, preferably in the range of 200 to 800.

The weight ratio between the lignin or tannin and the oxyalkylating agent is generally maintained 3:1 to 1:100. The preferred lignin or tannin to oxyalkylating agent weight ratio is 1:1 to 1:20.

After the oxyalkylating step the progress of which can be followed by viscosity measurement of the reaction mixture the formed oxyalkylated lignin or tannin polyol compound is recovered from the mixture. Usually purging with an inert gas is desirable to remove unreacted oxyalkylating agents from the oxyalkylated product. In case a catalyst is used it is advisable to remove the inorganic salts from the polyol product and an advantageous method to remove these salts is to dissolve the formed polyol in a liquid solvent such as methanol, ethanol or other liquid solvent for the polyol, precipitate the inorganic salts, filter the polyol solution and finally treat the resulting polycol solution with ion exchange resins. The polyol can be recovered from the solution by any conventional method such as by distilling off the solvent.

To form urethane products the polyoxyalkylene etherpolyol produced according to the present invention is reacted with aromatic or aliphatic isocyanates having at least two NCO groups per molecule. The choice of isocyanates suitable for producing urethane products depends upon the intended use for the resultant urethanes. The polyoxyalkylene ether-polyols produced according to the present invention can have a wide range of molecular weights and viscosities rendering them suitable for the preparation of a variety of flexible to rigid urethane foams by reaction with organic isocyanates and admixture with suitable blowing agents such as water or chlorinated fluorocarbons.

Other methods can be used for preparing the urethane foam, such as by reaction of the polyoxyalkylene etherpolyol with organic isocyanates under dry conditions using gaseous or gas-producing agents.

It is advantageous to incorporate a surface active agent or surfactant into the admixture to be foamed to obtain a uniform suspension.

The following examples are presented to illustrate the practice of the present invention.

Example I

A pressure reactor equipped with stirrer, gas addition tube, liquid addition tube, pressure gauge, thermocouple and pressure relief valve was charged with 100 grams of standard kraft lignin having a calculated hydroxyl number of about 1282. The reactor was sealed and 50 grams of propylene oxide were added through the liquid additions tube. The initial oxyalkylation reaction caused the reaction mixture to heat to about 70° C. and during this initial reaction the pressure in the reactor rose to about 18 p.s.i.g. The mixture was then externally heated to 150° C. and 270 grams of propylene oxide were added in increments so that the reaction pressure was maintained at about 50 p.s.i.g. After completion of the oxyalkylation reaction, nitrogen was bubbled through the reaction mixture to remove unreacted propylene oxide. The product was thereafter dissolved in methanol and the inorganic salts were removed from the polyol product by the addition of tartaric acid which formed insoluble precipitate with the inorganic salts present. After filtration the polyol solution was conducted though an ion exchange resin to remove any traces of inorganic salts. The treated solution was then evaporated on a rotary evaporator connected to a water aspirator.

The resulting polyol had a dark brown color, a viscosity of 261,200 cps. at 25° C. and a hydroxyl number of 306.

100 grams of the polyol was mixed with 30 grams of trichlorofluoromethane, 1.5 grams of silicone-glycol copolymer having a specific gravity of 1.07 at 25° C. available commercially as Dow Corning 193 Surfactant, and 3 grams of dimethylethanolamine. To this mixture 89 grams of polymethylenepolyphenyl polyisocyanate (equivalent weight 132.4) were added. The mixture was agitated for 30 seconds and then allowed to rise. Subsequent to the rising period the mixture was poured into a box having the approximate dimensions of 6 x 12 x 6 inches and allowed to stand at room temperature. The foam so produced had a density of 1.85 pounds per cubic foot, a stress of 18.3 pounds per square inch and a modulus of 286 pounds per square inch.

Example II

Into a reactor described in Example I, 100 grams of standard kraft lignin having a calculated hydroxyl number of about 735 was charged, to the lignin 55.5 grams of pentaerythritol and 3 grams of potassium hydroxide were added. The reactor was sealed and 50 grams of propylene oxide were added through the liquid addition tube. The initial oxyalkylation reaction caused the reaction mixture to heat to about 50–70° C. and during this initial reaction the pressure in the reactor rose to about 15–25 p.s.i.g. The mixture was then externally heated to about 150° C. and 234 grams of propylene oxide were added in increments so that the reaction pressure was maintained at about 50 p.s.i.g. After completion of the oxyalkylation reaction nitrogen was bubbled through the reaction mixture to remove unreacted propylene oxide. The product was thereafter treated in the same manner as the polyol of Example I.

The resulting polyol had a dark brown color, a viscosity of 33,500 cps. at 25° C. and a hydroxyl number of 359.

100 grams of the polyol were mixed with 30 grams of trichlorofluoromethane, 1.5 grams of Dow Corning 193 Surfactant and 3 grams of dimethylethanolamine. To this mixture 76 grams of polymethylene-polyphenyl polyisocyanate (equivalent weight 132.4) was added. The foam was prepared in the same manner as shown in Example I. The foam so produced had a density of 2.25 pounds per cubic foot, a stress of 32.9 pounds per square inch and a modulus of 629 pounds per square inch.

Example III

Into a reactor shown in Example I, 100 grams of standard kraft lignin having a calculated hydroxyl number of about 696 was charged. 54.7 grams of aniline and 3 grams of potassium hydroxide were also charged to the reactor which was then sealed and 50 grams of propylene oxide were added through the liquid addition tube. The initial oxyalkylation reaction caused the reaction mixture to heat to about 50–70° C. and during this initial reaction the pressure in the reactor rose to about 18–20 p.s.i.g. The mixture was then externally heated to about 150° C. and 257 grams of propylene oxide were added in increments so that the reaction pressure was maintained at about 50 p.s.i.g. After completion of the oxyalkylation reaction the reaction mixture was treated in the same manner as shown in Example I.

The resulting polyol had a dark brown color, a viscosity of 12,600 cps. at 25° C. and a hydroxyl number of 261.

100 grams of polyol was mixed with 30 grams of trichlorofluoromethane, 1.5 grams of silicone-glycol surfactant, having a specific gravity of 1.07 at 25° C. and commercially available as Union Carbide L–5320, 0.67 gram of dimethylethanol amine and 0.33 gram of dibutyltindilaurate. To this mixture 71.7 grams of polymethylene-polyphenyl polyisocyanate (equivalent weight 134.4) was added. A foam was produced in the same manner as shown in Example I and the foam so produced had a density of 1.66 pounds per cubic foot, a stress of 14.4 pounds per square inch and a modulus of 500 pounds per square inch.

Example IV

Into a reaction vessel described in Example I, 100 grams of demethylated kraft lignin having a calculated hydroxyl number of about 686 were charged. To the lignin, 34 grams of aniline and 3 grams of potassium hydroxide were added. The reactor was sealed and 50 grams of propylene oxide were added through the liquid addition tube. The initial oxyalkylation reaction caused the reaction mixture to heat to about 70–80° C. and during this initial reaction a pressure in the reactor rose to about 18–20 p.s.i.g. The mixture was then externally heated to about 150–170° C. and 144 grams of propylene oxide were added in increments so that the reaction pressure was maintained at about 50 p.s.i.g. After completion of the oxyalkylation reaction the product was purified in the same manner as shown in Example I.

The resulting polyol had a dark brown color, a viscosity of 144,000 cps. at 50° C. and a hydroxyl number of 335.

100 grams of the polyol was mixed with 30 grams of trichlorofluoromethane, 1.5 grams of the above-mentioned L–5320 silicone-glycol surfactant, and 3 grams of dimethylethanolamine. A foam was prepared in the same manner as shown in Example I and the foam so produced had a density of 2.1 pounds per cubic foot, a stress of 29.4 pounds per square inch and a modulus of 418 pounds per square inch.

Example V

Into a reactor described in Example I, 50 grams of demethylated kraft lignin having a calculated hydroxyl number of about 816 and 50 grams of standard kraft lignin having a calculated hydroxyl number of about 696 were charged. 33 grams of aniline and 3 grams of potassium hydroxide were added to the lignin and the reactor was sealed. Through the liquid addition tube 50 grams of propylene oxide were charged and the initial oxyalkylation reaction caused the reaction mixture to heat to about 50–70° C. and during this initial reaction the pressure in the reactor rose to about 18–20 p.s.i.g. The mixture was then externally heated to about 150–170° C. and 196 grams of proplyene oxide were added in increments so that the reaction pressure was maintained at about 50 p.s.i.g. After completion of the oxyalkylation reaction the resulting polyol was treated in the same manner as shown in Example I.

The resulting polyol had a dark brown color, a viscosity of 4,200 cps. at 25° C. and a hydroxyl number of 280.

100 grams of the polyol was mixed with 30 grams of trichlorofluoromethane, 1.5 grams Dow Corning 193 Surfactant, 0.67 dimethylethanolamine and 0.33 gram of dibutyltindilaurate. To this mixture 77.3 grams of polymethylene-polyphenyl polyisocyanate (equivalent weight 134.4) was added. The foam was prepared in the same manner as shown in Example I and the produced foam had a density of 1.97 pounds per cubic foot, a stress of 16.9 pounds per square inch and a modulus of 628 pounds per square inch.

Example VI

Into a reaction vessel of the type described in Example I, 100 grams of eucalyptus extract prepared by spray drying the water extract of eucalyptus and having a calculated hydroxyl number of about 968 was charged. To the eucalyptus extract 15 grams of sodium hydroxide and 250 grams of ethylene carbonate were added. The reaction vessel was sealed and the mixture was maintained at about 40° C. for about 24 hours after which the reactor was externally heated to about 120° C. until the oxyalkylation reaction was complete. The produced polyol was purified in the same manner as described in Example I.

The tannin polyol produced had a hydroxyl number of 372 and a viscosity of 71,000 cps. at 25° C. A polyurethane foam was prepared from the polyol in the same manner as described in Example I. The produced polyurethane foam exhibited properties similar to those prepared from the lignin polyols.

All viscosities were determined by using a Brookfield Synchro-lectric Viscometer LVD model with spindles 1 to 4.

The hydroxyl number of the polyoxyalkylene-polyether polyols was determined according to the method described by D. H. Reed et al. in Analytical Chemistry, volume 35, page 571 (1963).

The hydroxyl number of the starting materials was indirectly established by calculating at first the equivalent weight of the starting material from the polyol hydroxyl number using the following formula:

$$E_{w \text{ starting mat.}} = \frac{A \times 56,100}{OH_{polyol}}$$

where $E_{w \text{ starting mat.}}$ is the equivalent weight of either ligin or tannin, 56,100 is the equivalent weight of KOH in milligrams, A is the weight fraction of the starting material in the polyol and $OH_{polyol}$ is the hydroxyl number of the polyol determined by the above described method.

When the initial reaction mixture includes in addition to lignin or tannin a compound having "active hydrogen atoms," the equivalent weight of the lignin or tannin starting material is calculated according to the following modified formula:

$$E_{w\ starting\ mat.} = \frac{\dfrac{A \times 56{,}100}{OH_{polyol}}}{\dfrac{B \times 56{,}100}{OH_{polyol} \times E_{w\ act.\ H\ cpd.}}}$$

where $E_{w\ starting\ mat.}$ is the equivalent weight of lignin or tannin starting material, 56,100 is the equivalent weight of KOH in milligrams, A is the weight ratio of lignin or tannin starting material in the reaction mixture, B is the weight fraction of the active hydrogen atom containing material in the reaction mixture, $E_{w\ act.\ H\ cpd.}$ is the equivalent weight of the active hydrogen atom containing material and $OH_{polyol}$ is the hydroxyl number of the produced polyol.

From the equivalent weight of the starting material the hydroxyl number is calculated according to the following formula:

$$OH_{starting\ mat.} = \frac{56{,}100}{E_{w\ starting\ mat.}}$$

where $OH_{starting\ mat.}$ is the hydroxyl number of the lignin or tannin, 56,100 is the equivalent weight of KOH in milligrams and $E_{w\ starting\ mat.}$ is the equivalent weight of lignin or tannin starting material.

The properties of the produced urethane foam were established in the following manner; the foam density was established by volume and weight measurements, the foam stress and modulus values were measured on an "Instron" Tensile Testing Instrument, Model TT-C.

Condensed tannins appear to provide foams having a greater range of flexibility, or conversely, rigidity. Mixtures of tannins of the aforementioned two major groups with each other are also useful herein.

What is claimed is:

1. A one-step process for the preparation of a lignin polyhydroxy-polyalkylene ether-polyol which consists essentially of admixing a lignin material having a hydroxyl number of from 25 to 1500 with an oxyalkylating agent having from 2 to 7 carbon atoms and selected from the group consisting of alkylene oxides, sulfites and mixtures thereof, said agent being present in an amount to produce a lignin polyhydroxy-polyoxyalkylene etherpolyol having a hydroxyl number of from 50 to 1500, and continuously maintaining said admixture at a temperature of from 20° to 250° C. to convert said lignin to a lignin polyhydroxy-polyoxyalkylene ether-polyol.

2. A process according to claim 1 wherein the lignin material is lignin.

3. A process according to claim 1 wherein the oxyalkylating agent consists of an alkylene sulfite.

4. A process according to claim 1 wherein the oxyalkylating agent consists of a 1,2-alkylene oxide.

5. A process according to claim 1 wherein the oxyalkylating agent consists of a 1,2-alkylene sulfite.

6. A process according to claim 1 wherein the lignin material is admixed prior to the oxyalkylation reaction with a solvent having active hydrogen groups, said solvent being capable of undergoing oxyalkylation.

7. A process according to claim 1 wherein the polyhydroxy aromatic compound is admixed prior to the oxyalkylation reaction with a solvent inert to oxyalkylation.

8. A process according to claim 1 wherein to said admixture a catalyst selected from the group consisting of alkali metal and alkali earth metal hydroxides, oxides, carbonates is added.

References Cited

UNITED STATES PATENTS

| | | | |
|---|---|---|---|
| 2,448,767 | 9/1948 | Carlson | 260—284 |
| 2,819,261 | 1/1958 | Monson et al. | 260—209.5 |
| 2,854,444 | 9/1958 | Monson et al. | 260—124 |

OTHER REFERENCES

Brauns: "Chemistry of Lignin" (1952) p. 303.

CHARLES B. PARKER, Primary Examiner

D. R. PHILLIPS, Assistant Examiner

U.S. Cl. X.R.

260—2.5, 473.5

UNITED STATES PATENT OFFICE
CERTIFICATE OF CORRECTION

Patent No. 3,546,199        Dated December 8, 1970

Inventor(s) Daniel T. Christian, Melvin Look, Albert Nobell and Thomas S. Armstrong It is certified that error appears in the above-identified patent and that said Letters Patent are hereby corrected as shown below:

Column 3, line 69, "polycol" should be -- polyol --;

Column 6, line 69, "ligin" should be -- lignin --; and

Column 8, lines 20-21, "polyhydroxy aromatic compound" should be -- lignin material --.

Signed and sealed this 18th day of May 1971.

(SEAL)
Attest:

EDWARD M. FLETCHER, JR.
Attesting Officer

WILLIAM E. SCHUYLER, JR.
Commissioner of Patents